United States Patent
Kris et al.

(10) Patent No.: US 10,002,103 B2
(45) Date of Patent: *Jun. 19, 2018

(54) LOW-PIN MICROCONTROLLER DEVICE WITH MULTIPLE INDEPENDENT MICROCONTROLLERS

(71) Applicant: Microchip Technology Incorporated, Chandler, AZ (US)

(72) Inventors: Bryan Kris, Gilbert, AZ (US); Igor Wojewoda, Tempe, AZ (US); Alex Dumais, Gilbert, AZ (US); Mike Catherwood, Georgetown, TX (US); Brian Fall, Mesa, AZ (US); Jason Tollefson, Phoenix, AZ (US); Calum Wilke, Chandler, AZ (US); Dave Mickey, Chandler, AZ (US); Thomas Spohrer, Chandler, AZ (US); Jim Pepping, Gilbert, AZ (US); Vincent Sheard, Tempe, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/065,027

(22) Filed: Mar. 9, 2016

(65) Prior Publication Data
US 2016/0267047 A1    Sep. 15, 2016

Related U.S. Application Data

(60) Provisional application No. 62/133,186, filed on Mar. 13, 2015.

(51) Int. Cl.
*G06F 13/00* (2006.01)
*G06F 3/00* (2006.01)
(Continued)

(52) U.S. Cl.
CPC ........... *G06F 13/4282* (2013.01); *G06F 1/22* (2013.01); *G06F 13/1673* (2013.01);
(Continued)

(58) Field of Classification Search
None
See application file for complete search history.

(56) References Cited

U.S. PATENT DOCUMENTS 6,163,829 A     12/2000  Greim et al. ................ 710/260
6,496,880 B1 *  12/2002  Ma .......................... G06F 1/22
                                                     709/208

(Continued)

OTHER PUBLICATIONS

Partial International Search Report, Application No. PCT/US2016/021977, 7 pages, Jun. 23, 2016.

(Continued)

*Primary Examiner* — Hyun Nam
(74) *Attorney, Agent, or Firm* — Slayden Grubert Beard PLLC

(57) ABSTRACT

A microcontroller device has a housing with a plurality of external pins a first microcontroller with a first central processing unit (CPU), a first system bus coupled with the first CPU, first memory coupled with the first system bus, and a first plurality of peripheral devices coupled with the first system bus, and a second microcontroller with a second central processing unit (CPU), a second system bus coupled with the second CPU, second memory coupled with the second system bus, and a second plurality of peripheral devices coupled with the second system bus, wherein first and second microcontroller communicate only via a dedicated interface.

25 Claims, 5 Drawing Sheets

(51) Int. Cl.
  *G06F 13/42*    (2006.01)
  *G06F 13/364*   (2006.01)
  *G06F 13/16*    (2006.01)
  *G06F 13/38*    (2006.01)
  *G06F 15/167*   (2006.01)
  *G06F 1/22*     (2006.01)

(52) U.S. Cl.
  CPC .......... *G06F 13/364* (2013.01); *G06F 13/385* (2013.01); *G06F 15/167* (2013.01); *Y02D 10/14* (2018.01); *Y02D 10/151* (2018.01)

(56) References Cited

U.S. PATENT DOCUMENTS

| | | | |
|---|---|---|---|
| 2006/0010264 A1 | 1/2006 | Rader et al. | 710/23 |
| 2011/0040915 A1* | 2/2011 | Strauss | G06F 9/4818 710/267 |
| 2015/0074668 A1* | 3/2015 | Burka | G06F 11/3003 718/102 |
| 2016/0267046 A1* | 9/2016 | Kris | G06F 13/4282 |
| 2016/0371200 A1* | 12/2016 | Catherwood | G06F 13/102 |

OTHER PUBLICATIONS

International Search Report and Written Opinion, Application No. PCT/US2016/021977, 16 pages, Sep. 26, 2016.

\* cited by examiner

LOW-PIN MICROCONTROLLER DEVICE WITH MULTIPLE INDEPENDENT MICROCONTROLLERS

CROSS-REFERENCE To RELATED APPLICATIONS

This application claims priority to commonly owned U.S. Provisional Patent Application No. 62/133,186 filed Mar. 13, 2015; which is hereby incorporated by reference herein for all purposes.

TECHNICAL FIELD

The present disclosure relates to microcontrollers, in particular microcontroller device with multiple independent processor cores.

BACKGROUND

Known microcontroller devices comprise a single central processing unit (microcontroller core) and a plurality of associated peripheral devices, such as timers, analog-to-digital converters, digital-to-analog converters, pulse width modulation units; memories; input/output (I/O) ports, etc. Usually an internal system bus and control logic links all components such that the microcontroller core can individually access the peripherals. Externally, a microcontroller comprises a plurality of external pins wherein most of these pins are usually associated to an I/O port and each port pin may also provide for multifunction by sharing the pin with other peripheral devices. During configuration, a user selects which pin will be assigned to which function. Such assignments can also be changed during execution of a program.

Certain microcontrollers are known that comprise additional accelerator units that may be able to execute instructions separate from the main CPU. Other microcontrollers are known that include two separate CPUs and a plurality of common peripherals. Thus, both cores share all peripherals which requires a crossbar switch that adds latency and wherein the crossbar switch is vulnerable to failure. Existing multi-core devices use switch matrices to allow multiple processors to access shared system resources such as memory and peripherals. Multiple cores may request access to same resource. Conflict resolution circuitry adds latency, hurts performance, and adds cost. The switch matrix is a single point of failure for the system. Some manufactures may implement multiple switch matrices. This requires even more logic to handle fault resolution amongst the switch matrices. Other manufacturers use multiple cores with differing software architectures. These differing cores may have some dedicated resources but other resources are shared.

SUMMARY

There exists, however, a need for better implementation of dual or multi-core microcontroller devices.

According to an embodiment, a microcontroller device may compris a plurality of external pins, a first microcontroller comprising a first central processing unit (CPU), a first system bus coupled with the first CPU, first memory coupled with the first system bus, and a first plurality of peripheral devices coupled with the first system bus, and a second microcontroller comprising a second central processing unit (CPU), a second system bus coupled with the second CPU, second memory coupled with the second system bus, and a second plurality of peripheral devices coupled with the second system bus, wherein first and second microcontroller communicate only via a dedicated interface.

According to a further embodiment, the dedicated interface may comprise a bidirectional mailbox interface, a unidirectional master-slave interface and a unidirectional slave-master interface. According to a further embodiment, each unidirectional interface may comprise a FIFO memory. According to a further embodiment, the first microcontroller can be a master and the second microcontroller can be a slave. According to a further embodiment, a program memory of the second microcontroller may comprise volatile memory which is writable by the first microcontroller. According to a further embodiment, the second microcontroller can be clocked faster than the first microcontroller. According to a further embodiment, the second microcontroller comprises a power mode control unit comprising a low power mode, wherein the first microcontroller can be configured to control a power mode of the second microcontroller. According to a further embodiment, the power control mode unit can be operable to disable the second microcontroller such that the second microcontroller does not consume any power. According to a further embodiment, each microcontroller may have a data bus width of 16 bits. According to a further embodiment, each microcontroller may further comprise a pin select unit programmable to select at least some of the plurality of external pins for the peripheral devices associated with the microcontroller. According to a further embodiment, each microcontroller may further comprise a pad ownership multiplexer unit being controllable to assign control of input/output pins to either the first microcontroller or the second microcontroller. According to a further embodiment, each microcontroller can read any readable external pin but only pins assigned to the first or second microcontroller can be written by the respective microcontroller. According to a further embodiment, at least some of each of the peripherals of each microcontroller can be assigned to predetermined external pins of a plurality of external pins.

According to another embodiment, a method of operating a microcontroller device comprising a plurality of external pins, a first microcontroller comprising a first central processing unit (CPU), a first system bus coupled with the first CPU, first memory coupled with the first system bus, and a first plurality of peripheral devices coupled with the first system bus, a second microcontroller comprising a second central processing unit (CPU), a second system bus coupled with the second CPU, second memory coupled with the second system bus, and a second plurality of peripheral devices coupled with the second system bus, may comprise the step of: communicating between the first and second microcontroller only via a dedicated interface.

According to a further embodiment of the method, the dedicated interface may comprise a bidirectional mailbox interface, a unidirectional master-slave interface and a unidirectional slave-master interface. According to a further embodiment of the method, each unidirectional interface may comprise a FIFO memory. According to a further embodiment of the method, the first microcontroller can be a master and the second microcontroller can be a slave. According to a further embodiment of the method, a program memory of the second microcontroller may comprise volatile memory and wherein the method may comprise the step of writing to the program memory of the second microcontroller by the first microcontroller. According to a further embodiment of the method, the method may further comprise clocking the second microcontroller faster than the first microcontroller. According to a further embodiment of the method, the second microcontroller may comprise a power mode control unit comprising a low power mode, the method further comprising the step of controlling by first microcontroller a power mode of the second microcontroller. According to a further embodiment of the method, the method may comprise the step of disabling by the power control mode unit the second microcontroller such that the second microcontroller does not consume any power. According to a further embodiment of the method, the method may further comprise the step of controlling a pin ownership with respect to each microcontroller wherein input/output pins are assigned to either the first microcontroller or the second microcontroller. According to a further embodiment of the method, each microcontroller can read any readable external pin but only pins assigned to the first or second microcontroller can be written by the respective microcontroller. According to a further embodiment of the method, the method may further comprise the steps of: reading one of a plurality of external pins by the first microcontroller, reading the one of a plurality of external pins by the second microcontroller, and comparing the value read from the one of the plurality of external pins by means of the dedicated interface.

DETAILED DESCRIPTION

Figure 1:
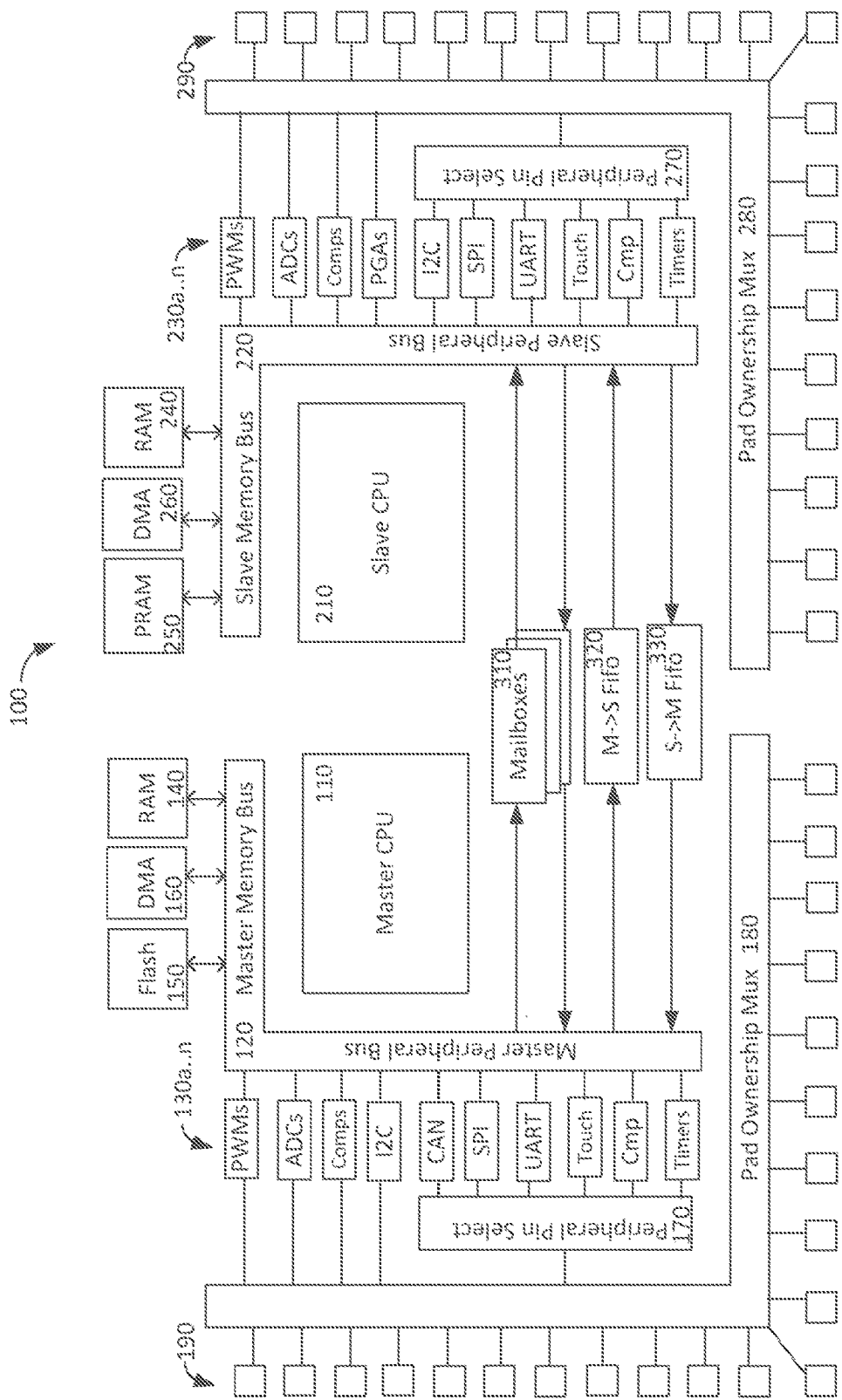
FIG. 1 shows a block diagram of a microcontroller according to an embodiment.

A microcontroller is generally considered as a system on a single chip as it doesn't require any external components. Such a device therefore comprises a central processing unit, memory and a plurality of I/O peripherals. In addition I/O ports may be used for direct digital control. These I/O ports are usually shared with the peripheral functions and can be programmed to have general purpose I/O port function or a specific peripheral function.

In low pin count packages, for example a 28-pin package, application performance of a conventional single-core microcontroller can be increased by providing two processor cores each having a data buswidth of 16 bit. Furthermore, the customer software development for real time control system can be facilitated, increased safety monitoring (Class B) can be provided and error mitigation can be improved by the separation of hardware, software and peripheral resources, into multiple independent microcontrollers according to various embodiments.

According to some embodiments, a microcontroller device can be provided with multiple instances of independent MCUs on a single die in low pin count packages (28-pins to 64 pins). Thus, an integrated circuit package will include, e.g. two independent microcontrollers, each one of them with its own memory and a plurality of associated peripheral devices. One microcontroller can be configured to be a master microcontroller and the other one can be a slave microcontroller according to some embodiments. While both microcontrollers may have the same or similar peripheral devices, the peripheral devices can be different and, in particular, may be adapted specific tasks for which the respective microcontroller is intended. Furthermore, the sizes for data and program memory may differ, wherein the master may generally comprise larger program and data memories.

Thus, according to various embodiments, the assembly of two (or more) microcontrollers with their own dedicated processor, memory and peripheral resources onto a single silicon die is provided. The multiple microcontrollers share device pins which makes the inclusion of the device into low pin count packages possible and viable. The external pins can thus under program control (or configuration register control) be assigned to either the master MCU or the slave MCU. According to a rule of the present disclosure with respect to some embodiments, the number of external pins is less than the sum of the data buswidth of all the integrated MCUs. For example, a two core MCU may comprise two 16-bit MCUs each having a data buswidth of 16 bit. The sum of the data buswidth of all integrated MCUs would therefore be 32. When implementing such a device in a 28 pin housing, such a device would follow the above mentioned rule.

According to various embodiments, in a multi-core MCU (multi-processor) device the Number of external pins <=Number of cores times a bit-width of each processor. In particular, according to some embodiments, the number of external pins is lower that the data bus width of the master processor. For example, a dual core microcontroller according to various embodiments can be fitted within a 28 pin housing as will be explained in more detail below. As mentioned above, the various embodiments consists of a microcontroller device with a multitude of Micro Controller Units (MCUs), each with its own processor, memory, and peripherals.

The plurality of MCUs are designed to share external device pins. All MCUs can be configured to allow reading (or observing) of a pin through its dedicated special function register, however, the writing (driving) to a pin through a dedicated register is controlled via non volatile memory. The nonvolatile memory is therefore used to define an "ownership" of the device pins thereby preventing conflicts. The ownership may be defined during a configuration phase, e.g. during programming of the device using configuration registers that cannot be altered once the device is in operating mode. Alternatively, special function registers and procedures may be implemented that allow a dynamic assignment through the use of special function registers. In advertend overwriting of such registers may be prevented through special write routines, similar to those used in conventional EEPROM write routines. The assignment to one of the external pins to one of the cores protects against software and hardware failures. The controllable sharing of device pins enables a multi-core device to be practical in a low pin count package.

According to various embodiments, two (or more) microcontrollers are assembled with their own dedicated processor, memory and peripheral resources onto a single silicon die wherein a specific communication interface between the cores is provided. The microcontrollers communicate with each other via the MasterSlave Interface (MSI) which according to one embodiment can be a set of registers (mailboxes) and associated status bits and interrupts (semiphores).

The classic computer architecture approach is to have multiple processors communicate with the device resources such as memory and peripherals via a switch matrix. In these conventional embodiments, the two (or more) processors share all of the system resources. The switch matrix must assign priority to each request from each processor for each resource, and conflicts must be resolved. This resource conflict management greatly adds latency (time) to each request. Switch matrices are large and vulnerable to single point failures. A classic solution to solve the vulnerabilities of switch matrices is to replicate the switch matrices. This requires yet more circuity to detect failures and resolve which switch matrix is still viable. The various embodiments avoid the complexity of attempting to use switch matrices to share resources, by instead just replicating the resources.

The second typical architecture is the concept of a processor plus a coprocessor that share some peripherals, but have access to their own limited set of resources such as memory and some peripherals. This architecture typically has a number of peripherals that are expensive to replicate and therefore are shared between the processor and coprocessor. Typically, the processor and coprocessor may have different software architectures and therefore require different development tools for software generation.

Instead of these conventional approaches, as shown for example in FIG. 1 according to various embodiments, an entire MCUs (Micro Controller Units) each with dedicated memory and peripherals is replicated into a single chip. The separate MCUs share device pins via secure nonvolatile registers to prevent conflicts when driving a device pin, but all MCUs can read the device pins at any time even those that are not assigned to them. The example in FIG. 1 results in a high pin count device.

FIG. 1 shows a dual core microcontroller 100 with two microcontrollers within a single integrated circuit housing. The first microcontroller comprises a CPU 110, a system bus 120 and a plurality of peripherals 130*a* . . . *n* as well as data memory 140, e.g. 16 kbBytes RAM, a program memory 150, e.g. a 128 kBytes flash memory, and a DMA controller 160. The system bus can be divided into two busses, a peripheral bus and a memory bus as indicated in FIG. 1 or a single system bus connecting all devices may be implemented. Some of the peripherals, such as the DMA controller 160 may not have any external connection and other peripherals, such as PWMs, ADCs, comparators, and some serial interfaces may be assigned to predetermined external multi-function pin. Other peripherals, such as other serial interfaces, touch sensors, timers, comparator outputs may be assigned to one of a plurality of external pins via a peripheral pin selector unit 170. Some pins may be assignable to more than one peripheral of the first MCU and in general share its function with a general purpose I/O port of the MCU. Therefore, this embodiment provides for two pad ownership multiplexers 180 and 280. In a default assignment, each pin associated with the master or slave MCU may be assigned to a general purpose I/O port of the respective MCU but can under program control of the pad ownership multiplexer 180 be assigned to one of the peripherals. Some pins 190 may be assigned to a peripheral by default, such as a serial programming interface, an ADC or any other peripheral as shown in FIG. 1. As mentioned above, the peripheral pin select unit 180 may furthermore allow to assign some or all of the peripheral to be assigned to any of the respective set of external pins.

Figure 2:
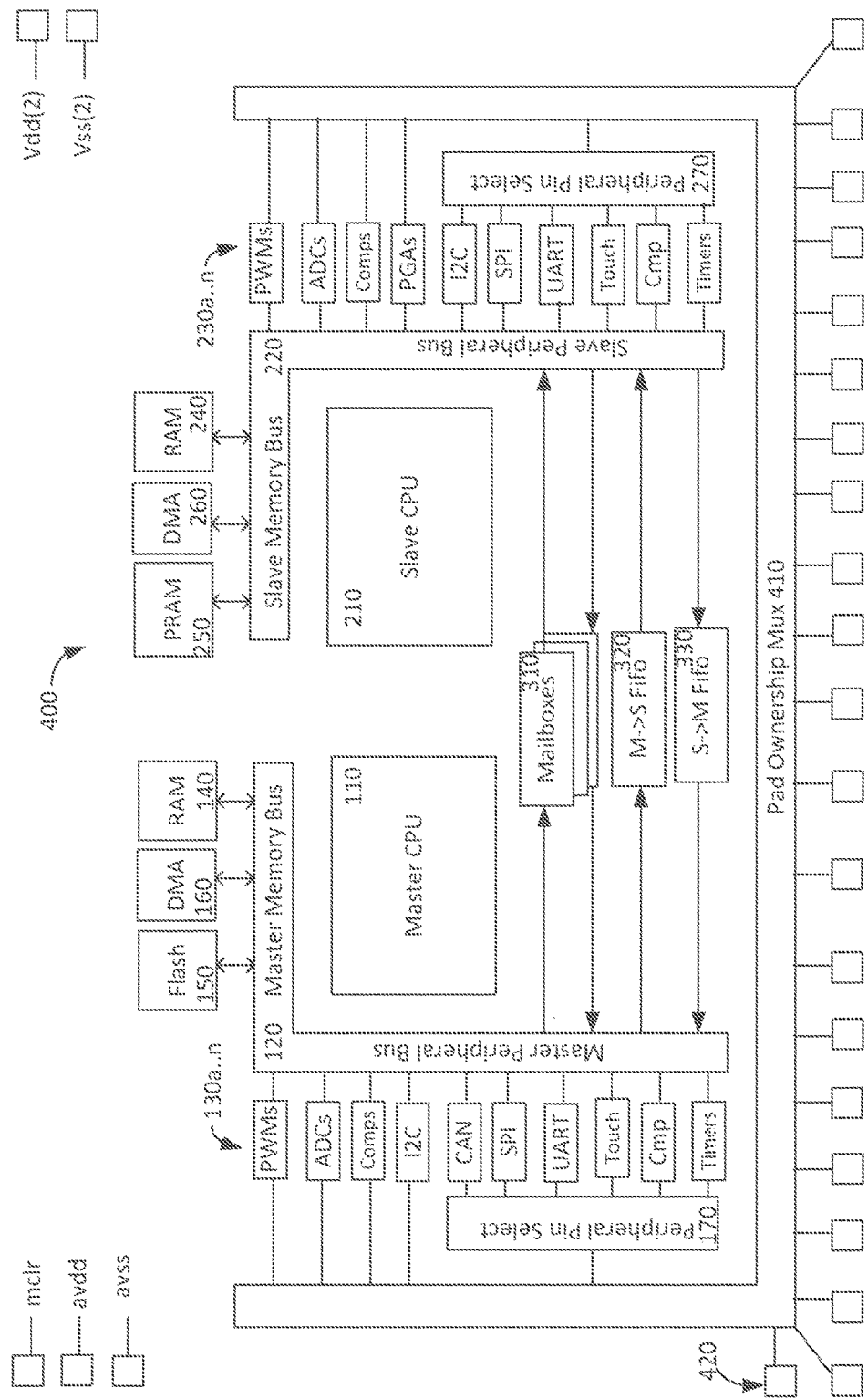
FIG. 2 shows a block diagram of a microcontroller according to another embodiment.
Figure 3:
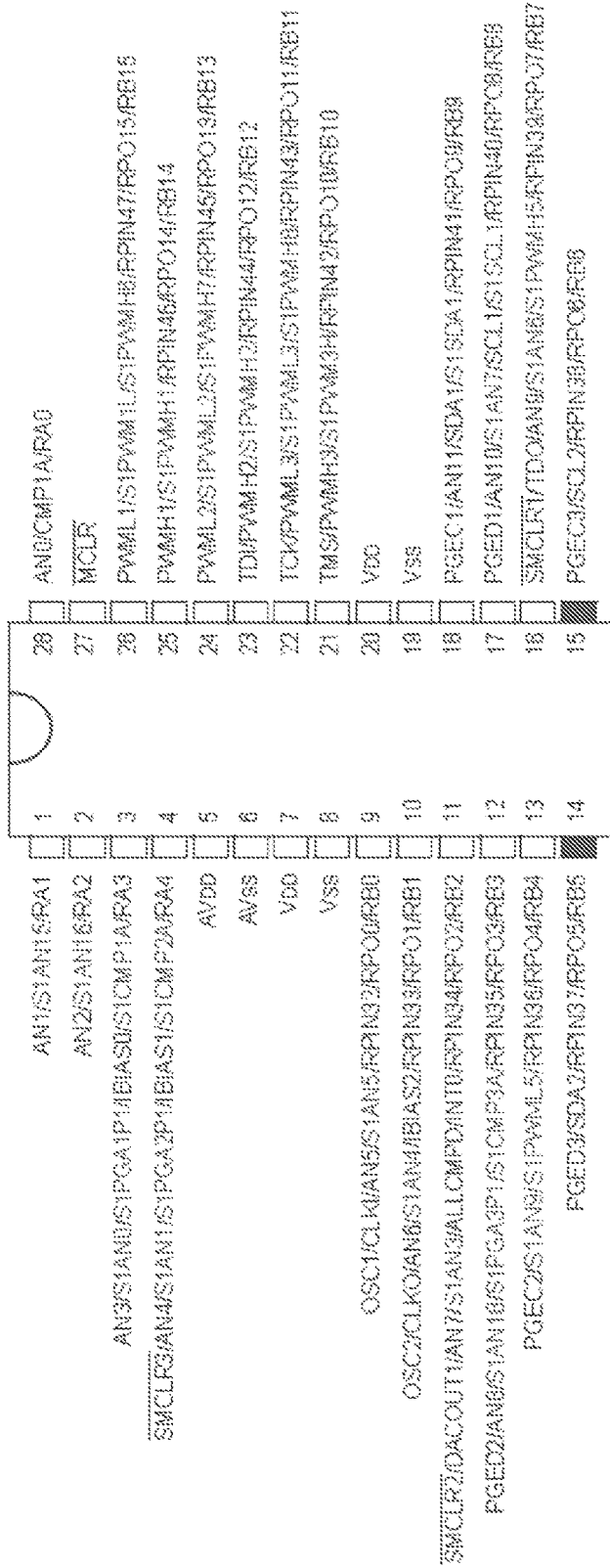
FIG. 3 shows a top view of a housing for a microcontroller according to various embodiments.

The external pins comprise a first set of pins used to provide power to the dice. This can include digital and analog power supply pins and multiple instances of such pins as, for example, shown in FIG. 2. Furthermore, a master clear pin may have no other function and may be used to reset and/or program the device. The remaining second set of pins are generally input/output pins I/O pins). However, some other pins not controlled by one of the microcontrollers may be present. An I/O pin according to this disclosure is defined as any pin that has is programmable to be either an input pin or an output pin or a pin that has a dedicated input or output function. An input pin can be used for digital or analog input according to a setting of a respective peripheral. Similarly, an output pin can be used for digital or analog output according to the setting of a respective peripheral. As mentioned above, the present application refers generally to input/output pins, some pins may only be allowed to be used as input or output pins. All input/output pins are pins controlled by one of the microcontrollers when outputting signals and signals fed to these pins are signals received by one of the microcontrollers. Power supply pins are generally not considered to have this function. Some other pins may also not have such a functionality, for example, a device may have dedicated pins for an oscillator. However, such spins may also be multiplexed with microcontroller I/O functions as shown in FIG. 3. FIG. 3 shows that pins that would not be considered as I/O pins are pins 5-8, 19, 20, and pin 27.

Special function registers may be used to control the pad ownership multiplexers. In this embodiment, each microcontroller core may only have access to its special function registers. However, according to yet another embodiment, only the master MCU may have access to the special function registers controlling the two pad ownership multiplexers 180, 280. In addition, the master CPU 110 may also have access to the program RAM 250 of the slave MCU either directly or through a specific interface. This feature allows a programming/writing of the program RAM 250 of the slave MCU through the master MCU.

The second MCU in this embodiment comprises pins 290, CPU 210, a system bus 220 and a plurality of peripherals 230*a* . . . *n* as well as data memory 240, e.g. a 4 kByte RAM, a program memory 250, e.g. a 24 kByte RAM, and a DMA controller 260. As mentioned above, the program memory 250 may be volatile to allow programming through the master MCU. However, other implementations are possible according to other embodiments. All other units may be similar to the master MCU. A second peripheral pin select unit 270 is provided to allow a flexible assignment of some of the external pins 290 to certain peripherals similar to the first MCU. However, in this embodiment, there is no sharing of pins between the two MCUs.

FIG. 1 shows furthermore a communication interface between the two MCUs via a bidirectional mailbox system 310 and two unidirectional FIFOs 320 and 330 that allow communication between the two cores in either direction. The mailboxes can be used to transfer a command or short data to the respective other microcontroller. A plurality of mailboxes 310 as indicated in FIGS. 1 and 2 may be implemented. Once a data or command has been written into the mailbox, a respective interrupt will be generated within the receiving microcontroller to indicate that a new message (command or data) is available. This allows for a fast transfer of information without any additional delay.

In addition, two FIFOs 320 and 330 can be implemented that allow for a larger data transfer between the two microcontrollers. The FIFOs 320 and 330 allow for larger data transfers as they do not have the size limitations of a mailbox 310. Provided the FIFOs 320, 330 does not become empty (or encounters an error condition), the Master and Slave may access it concurrently. A FIFO 320, 330 may therefore offer a better throughput than a mailbox 310 based data pipe which must be loaded by one processor before being read by the other. However, the FIFO 320, 330 contents are loaded and unloaded in order, and are not randomly accessible like the data within a mailbox data pipe. A FIFO is also (by definition) unidirectional. This makes the FIFO better suited to applications needing the fastest means to transfer blocks of data between processors.

The multitude of microcontrollers may share a common software architecture. Thus, according to one embodiment, identical microcontroller cores are used for the various integrated microcontrollers. The concept of providing a master and one or multiple slave microcontrollers further allows to reduce power consumption. The slave microcontrollers may be configured to be disabled thereby being put in a sleep mode that does not require much energy. According to other implementations, a microcontroller within the device may be turned off completely to save energy.

Figure 5:
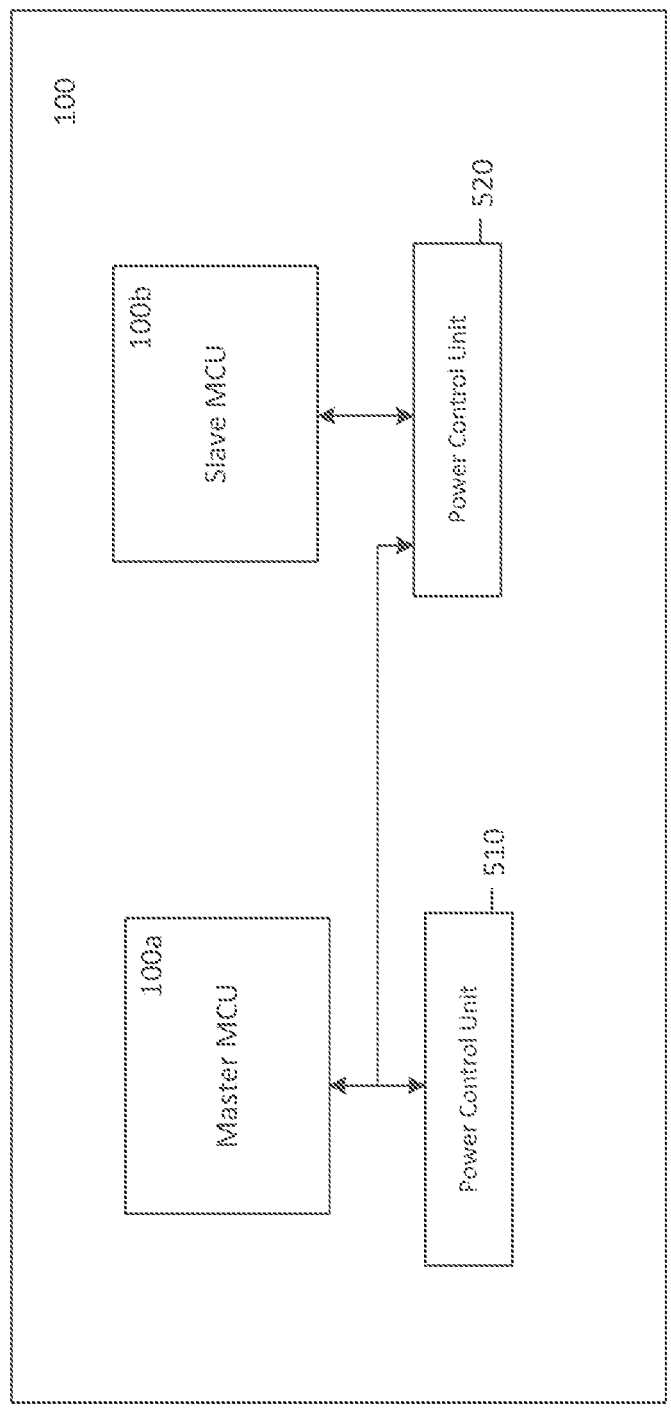
FIG. 5 shows power control of the microcontrollers according to an embodiment.

FIG. 5 shows an exemplary control structure of such a system. Each microcontroller 100a, 100b may have a dedicated power control unit 510 and 520, respectively. Each power control unit 510, 520 may allow to set a specific power consumption mode and associated processing power. For example, each microcontroller 100a 100b may be set into a sleep or low power mode. Various levels of power consumption may be provided. In addition, according to one embodiment, the master microcontroller 100a may be able to turn off the slave microcontroller 100b entirely. In this mode, the microcontroller 100b will have no power consumption.

The cores may furthermore run at different speeds. This feature can be particularly implemented when using volatile memory as the program memory for the second microcontroller. Volatile memory such as RAM is inherently faster and thus allows for faster access time and therefore a higher clocking rate. The master core may be configured to handle system level functions with frequent interrupts. It can further handle safety compliance features, communications, interrupt handling, software updates, user interface, etc. Due to the feature that every microcontroller is allowed to read any of the external pins, the safety can be improved by multiple MCUs monitoring, e.g., the same device pins. For example according to an embodiment, the two microcontrollers may comprise software to provide for an enhanced safety feature, wherein one of a plurality of external pins is read by the first and second microcontroller independently. Then, the retrieved values can be compared by means of the communication interface. For example, in caser of a single pin, one of the mailboxes may be used to forward the read value to the other core. Alternatively, one of the FIFOs 320, 330 may be used to forward one or more values. The system can output an alert in case the values do not match up or a specific software routine, interrupt or reset may be executed to correct the error.

According to various embodiments, time sensitive code can be partitioned which eases code development & support. The slave core can be used for dedicated and more deterministic application performance, such as control loops with critical latency, motor control, digital power control. Thus, as a slave microcontroller it can be considered as an additional programmable peripheral for the master microcontroller. Benefits for such an architecture are a step function performance increase. The two cores basically double the execution rate. As mentioned above, time critical functions and system functions can be separated and assigned to the different cores. Control loop responsiveness can be optimized, interrupts can be minimized, and motor algorithm implementation can be simplified. The execution speed of the master core can be for example 100 MIPS according to one embodiment whereas the slave core target may have a processing power of >100 MIPS by providing a faster program memory, e.g. a volatile random access memory. Thus, the slave microcontroller can be generally faster than the master microcontroller.

The number of required external pins can be further reduced by sharing pins used for the peripherals between the two MCUs as shown in FIG. 2 according to some embodiments. FIG. 2 shows a block diagram of the multi-core device in a package with a reduced number of pins 420 as opposed to the embodiment shown in FIG. 1. FIG. 2, in particular shows a 28-pin version of a dual core microcontroller with two separate MCUs. Here, only a single pad ownership multiplexer 410 may be provided which may only be controlled by the master MCU, e.g. through special function registers. However, according to some embodiments, both MCUs may have access wherein in one embodiment the master MCU may have priority over the slave MCU.

The reduced number of I/O pins available provides still the same or even more pins to each MCU. In particular low cost applications that only require certain peripherals benefit from this solution as such a low-pin device reduces amongst others the cost for a printed circuit board. The pad ownership multiplexer 410 allows to share general purpose port functionality of each MCU with the external pins as well as assignment to one of the peripherals of either the master MCU or the slave MCU.

FIG. 2 shows furthermore four digital power supply pins Vdd and Vss, a non-multiplexed master clear function pin which is used for reset and programming and two analog power supply pins AVdd and AVss. The remaining 21 pins are externa/I/O pins that can be either assigned to the master MCU or the slave MCU. Thus, in certain configurations all 21 I/O pins may be assigned to the master MCU which reduces the functionality of the slave MCU to that of a co-processor. Similarly, another configuration may assign all 21 I/O pins to the slave MCU. Any other assignment having any ration between master MCU and slave MCU assignment is possible.

Figure 4:
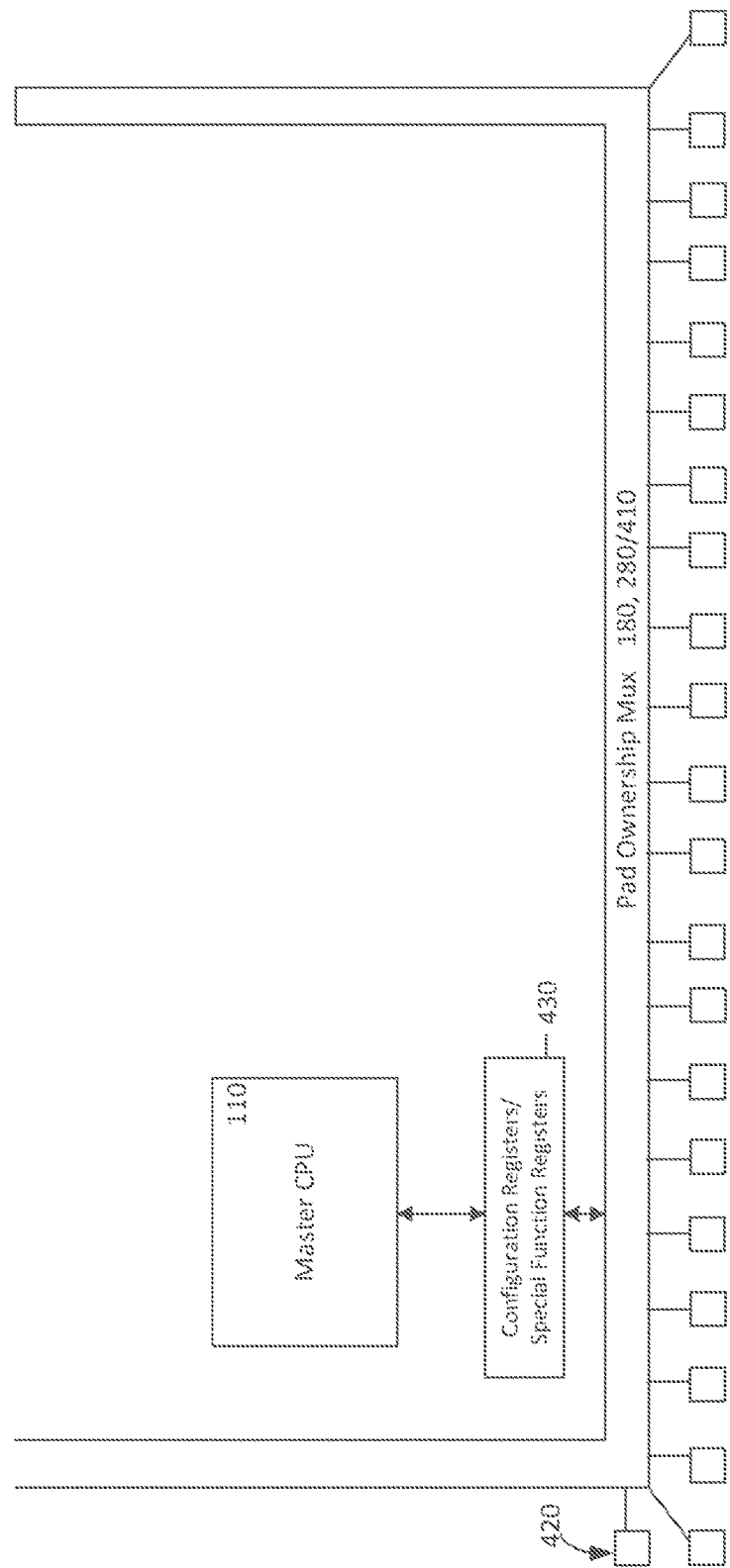
FIG. 4 shows an embodiment of the pad ownership control mechanism.

FIG. 4 shows a possible control of the pad ownership multiplexers 180, 280 of FIG. 1 or or pad ownership multiplexers 410 of FIG. 2. Control can be accomplished via configuration registers 430. Such registers are automatically programmed according to a setting with an external programmer or emulator device. Thus, once programmed, the setting cannot be altered during operation of the device 100. Alternatively, special function registers may be used to control the ownership pad multiplexers 180, 280/410. In such an embodiment, dynamic control is possible. To avoid accidental overwriting, a write mechanism similar to those used in EEPROMs may be used, e.g., a sequence of special codes written within a time frame.

FIG. 3 shows an actual pinout of the device in a 28-pin package. Slave peripherals are indicated by a prefix "S1". FIG. 3 in particular shows the multi-function assignment of each pin. FIG. 3 does not necessarily show all the functions that can be assigned to the external pins for better legibility as will be explained in more detail below. Here, typically RAx refers the pins for general purpose I/O Port A having 5 bits and RBx refers to a 16-bit port RB. As mentioned above, FIG. 3 shows only a single set of I/O Ports A and B for a better legibility. However, two separate sets which are independently controlled by the master and the slave MCU are implemented and may be independently assigned. According to one embodiment, each port pin can be either assigned to the master or the slave with a general pin association as shown in FIG. 3. According to one embodiment, assignments to the master MCU may have priority over an assignment to a slave MCU. According to other embodiments, the ports for the master MCU and the slave MCU may be assigned to different pins.

ANx refers to analog inputs for the master MCU and S1ANx to analog inputs for the slave MCU. Similar to the port pins, other associations to external pins may be chosen for the master and slave MCU. In case a capacitive voltage divider peripheral is implemented, each analog pin may also be assigned to a capacitive voltage divider function, wherein separate units for the master MCU and the slave MCU may be provided. RPx refers to 16 pins assigned by the peripheral pin select units. Similar to the I/O ports, master and slave MCU may each have, e.g., 16 pins available while FIG. 3 shows only a single set (again, for better legibility). According to other embodiments, a different number of peripheral pin select pins may be used, e.g., 8 of these pins may be assigned to the master and 8 pins to the slave MCU. Again, other number of pins and/or assignments of such peripheral pin select units may be chosen. Other pin functions such as pulse width modulator pins use respective acronyms such as PWM, wherein S1 at the beginning of an acronym generally indicates that the unit belongs to the slave MCU.

As mentioned above, each pin may be assigned by default to a specific function. For example, pins 1-3 can be assigned by default as analog inputs of the master MCU. Pins 4 and 11 can be assigned by default as analog inputs of the slave MCU. Pins 9 and 10 can be by default oscillator input pins but may also be assigned to other functions when the internal oscillators are used. Pins 12-13 can be assigned by default to the synchronous serial programming interface PGED2, PGEC2 that interacts only with the master MCU. Pins 14-18 and 21-26 are by default assigned to PORTB bits 5-15 and pin 28 to bit 0 of PORTA. The above assignment is merely an example, other assignments are possible.

What is claimed is:

1. A microcontroller device comprising:
a plurality of external pins;
a first microcontroller comprising a first central processing unit (CPU), a first system bus coupled with the first CPU, first memory coupled with the first system bus, and a first plurality of peripheral devices coupled with the first system bus,
a second microcontroller comprising a second central processing unit (CPU), a second system bus coupled with the second CPU, second memory coupled with the second system bus, and a second plurality of peripheral devices coupled with the second system bus,
wherein first and second microcontroller are separate from each other and do not share any of their peripheral devices and communicate only via a dedicated interface,
wherein the dedicated interface comprises a bidirectional mailbox interface, a unidirectional master-slave interface and a unidirectional slave-master interface, and
wherein each unidirectional interface comprises a FIFO memory.

2. The microcontroller device according to claim 1, wherein the dedicated interface further comprises a bidirectional mailbox interface.

3. The microcontroller device according to claim 2, further comprising a common pad ownership multiplexer unit being controllable to assign control of input/output pins to either the first microcontroller or the second microcontroller.

4. The microcontroller device according to claim 1, wherein the first microcontroller is a master and the second microcontroller is a slave.

5. The microcontroller device according to claim 4, wherein a program memory of the second microcontroller comprises volatile memory which is writable by the first microcontroller.

6. The microcontroller device according to claim 5, wherein the second microcontroller is clocked faster than the first microcontroller.

7. The microcontroller device according to claim 4, wherein the second microcontroller comprises a power mode control unit configured to operate the second microcontroller in a low power mode, wherein the first microcontroller is coupled with the power mode control unit (520) and configured to control a power mode of the second microcontroller.

8. The microcontroller device according to claim 7, wherein the power control mode unit is operable to disable the second microcontroller such that the second microcontroller does not consume any power.

9. The microcontroller device according to claim 7, wherein each system bus has a data bus width of 16 bits.

10. The microcontroller device according to claim 1, wherein each microcontroller further comprises a pin select unit programmable to select at least some of the plurality of external pins for the peripheral devices associated with the microcontroller.

11. The microcontroller device according to claim 1, wherein each microcontroller further comprises a pad ownership multiplexer unit being controllable to assign control of predefined sets of input/output pins to selected peripherals of the first microcontroller or the second microcontroller, respectively.

12. The microcontroller device according to claim 11, wherein each microcontroller can read any readable external pin but only pins assigned to the first or second microcontroller can be written by the respective microcontroller.

13. The microcontroller device according to claim 11, wherein at least some of each of the peripherals of each microcontroller are assigned to predetermined external pins of a plurality of external pins.

14. A method of operating a microcontroller device comprising a plurality of external pins, a first microcontroller comprising a first central processing unit (CPU), a first system bus coupled with the first CPU, first memory coupled with the first system bus, and a first plurality of peripheral devices coupled with the first system bus, a second microcontroller comprising a second central processing unit (CPU), a second system bus coupled with the second CPU, second memory coupled with the second system bus, and a second plurality of peripheral devices coupled with the second system bus, wherein first and second microcontroller are separate from each other and do not share any of their peripheral devices, the method comprising:
communicating between the first and second microcontroller only via a dedicated interface, wherein the dedicated interface comprises a unidirectional master-slave interface and a unidirectional slave-master interface each comprising FIFO memory.

15. The method according to claim 14, wherein the dedicated interface further comprises a bidirectional mailbox interface.

16. The method according to claim 15, further comprising the step of assigning control of input/output pins to either the first microcontroller or the second microcontroller through a common pad ownership multiplexer unit.

17. The method according to claim 14, wherein the first microcontroller is a master and the second microcontroller is a slave.

18. The method according to claim 17, wherein a program memory of the second microcontroller comprises volatile memory and wherein the method comprises the step of writing to the program memory of the second microcontroller by the first microcontroller.

19. The method according to claim 18, further comprising clocking the second microcontroller faster than the first microcontroller.

20. The method according to claim 17, wherein the second microcontroller comprises a power mode control unit coupled with the first microcontroller and configured to control a power mode, including a low power mode, of the second microcontroller, the method further comprising the step of controlling by the first microcontroller a power mode of the second microcontroller through said power mode control unit.

21. The method according to claim 20, comprising the step of disabling by the power control mode unit the second microcontroller such that the second microcontroller does not consume any power.

22. The method according to claim 14, further comprising the step of controlling a pin ownership with respect to each microcontroller wherein predefined sets of input/output pins are assigned to selected peripherals of the first microcontroller or the second microcontroller, respectively.

23. The method according to claim 22, wherein each microcontroller can read any readable external pin but only pins assigned to the first or second microcontroller can be written by the respective microcontroller.

24. The method according to claim 23, further comprising the steps of reading one of a plurality of external pins by the first microcontroller, reading the one of a plurality of external pins by the second microcontroller, comparing the value read from the one of the plurality of external pins by means of the dedicated interface.

25. The method according to claim 14, further comprising the step of assigning control of input/output pins to either the first microcontroller or the second microcontroller by a common pad ownership multiplexer unit.

* * * * *